UNITED STATES PATENT OFFICE.

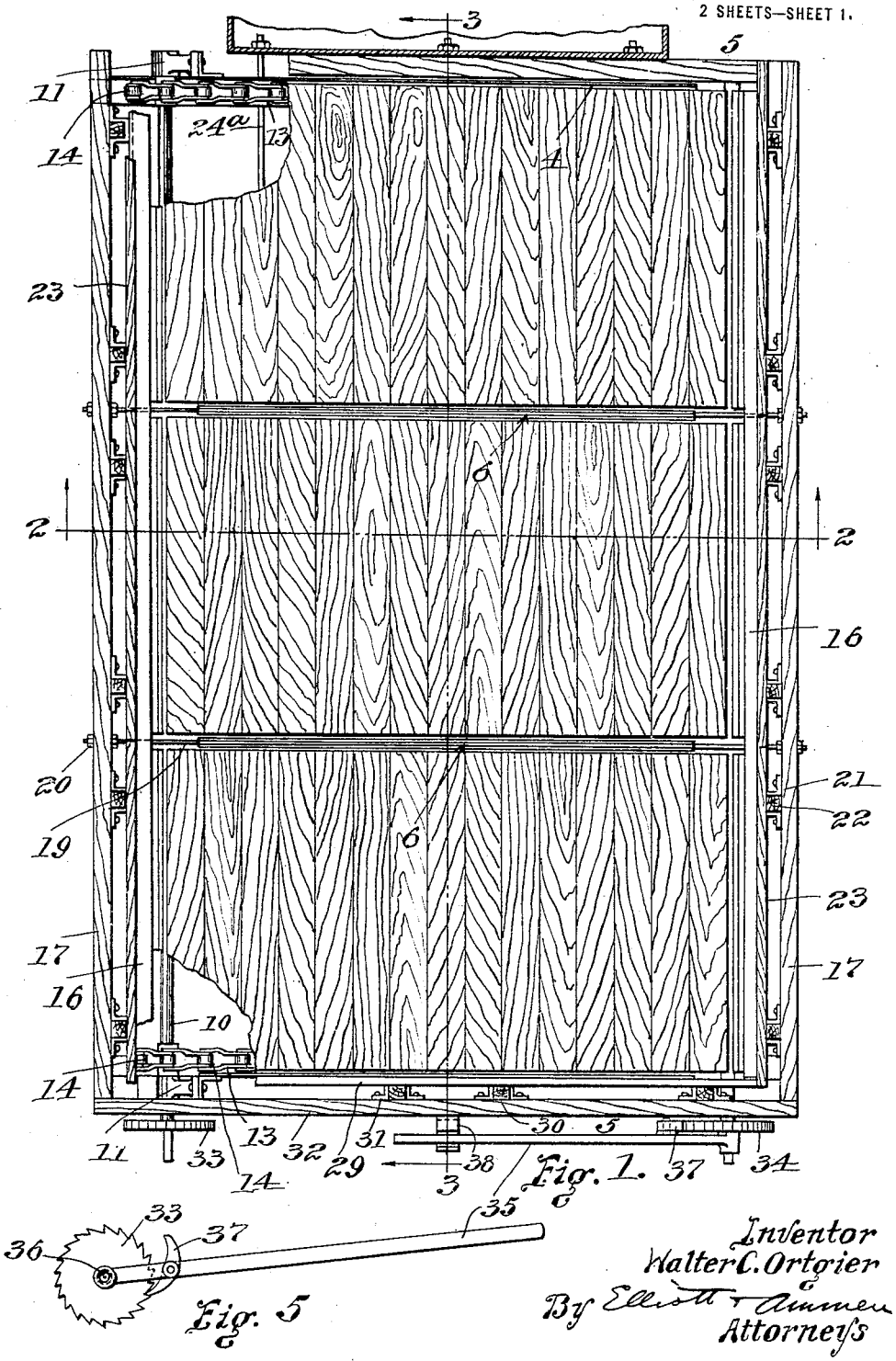

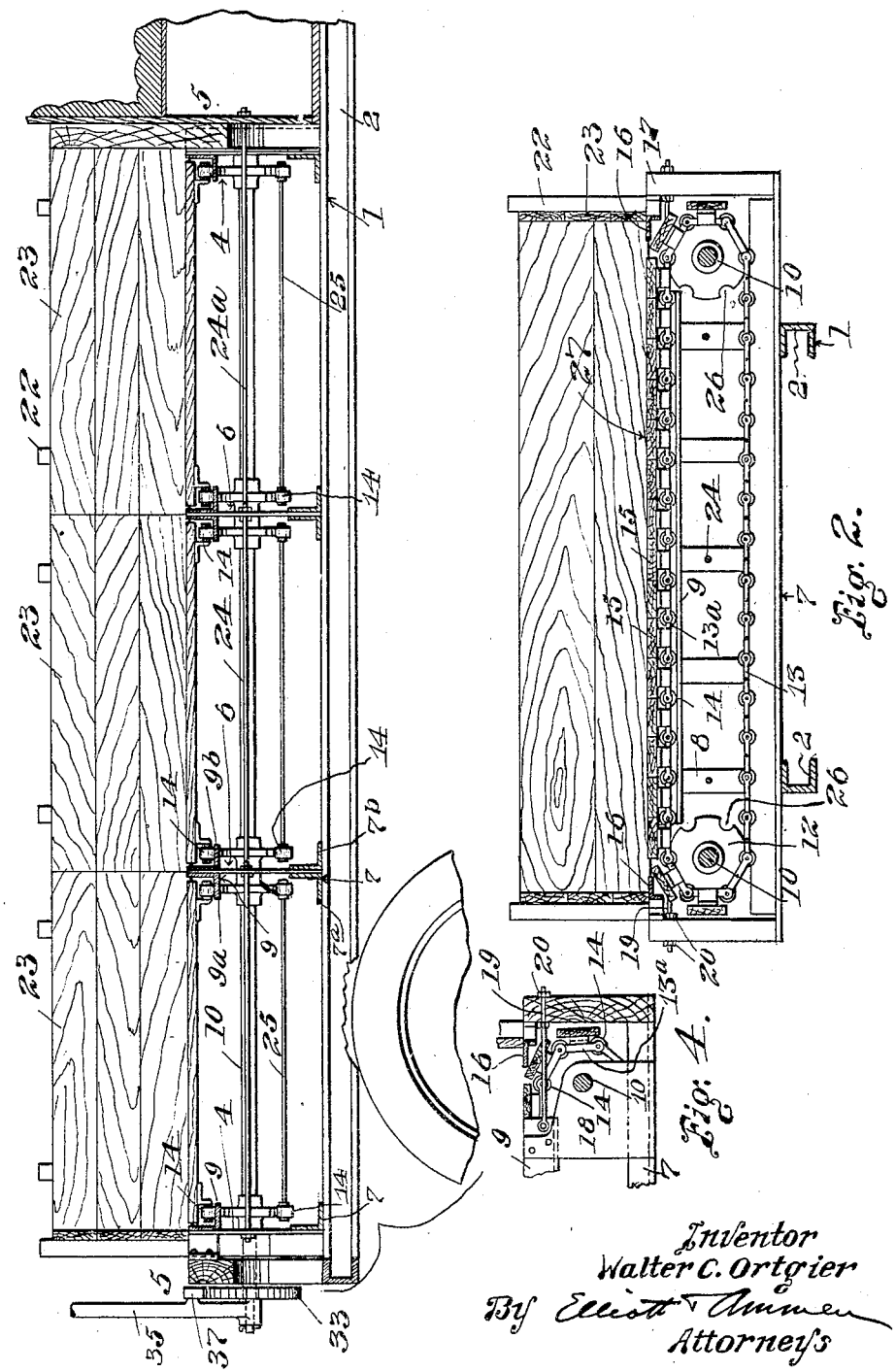

WALTER C. ORTGIER, OF WICHITA FALLS, TEXAS.

TRUCK.

1,375,535.  Specification of Letters Patent.  Patented Apr. 19, 1921.

Application filed December 22, 1919. Serial No. 346,722.

*To all whom it may concern:*

Be it known that I, WALTER C. ORTGIER, a citizen of the United States, residing in the city of Wichita Falls and State of Texas, have invented new and useful Improvements in Trucks, of which the following is a specification.

This invention relates to trucks. In the usual method of unloading bricks or other materials which must be handled in unloading them, the bricks must be carried or thrown from the remote points on the truck, to a man standing at the side of the truck who receives the bricks from the man standing on the truck. This manner of unloading a truck necessitates the use of two men.

The general object of the invention is to produce a truck so constructed that it can be quickly unloaded by one man standing on the ground at the side of the truck, and unassisted by anyone on the truck. To this end the invention concerns the construction of the truck, which is such that it enables the load on the truck floor to be moved from time to time toward the side of the truck where the unloading is taking place. In this way the load on the truck is constantly within reach of the man standing on the ground at the side of the truck. I am aware that it has been proposed to construct a truck with a floor movable longitudinally of the truck. Such a construction necessitates very frequent movement of the floor in unloading the truck, and furthermore, it does not render all portions of the truck so accessible as where the truck unloads from the side, as in my invention. While my truck is capable of being unloaded quickly by one man, it also can be used with facility by one man to place a load on the truck. Furthermore, in the type of truck in which the unloading is effected at the rear of the truck, there is considerable difficulty in supporting the movable floor along the longitudinal or middle line of the truck, ordinarily necessitating the use of a frame bar which considerably increases the weight and difficulty of constructing the truck. According to my invention, I provide a plurality of comparatively light transverse girders, supporting sections of the floor, and the distance between these girders and between the girders and the ends of the truck can be readily adapted to the uses or the requirements of different loading conditions. On account of the fact that this truck can be readily loaded or unloaded by a single workman, great economy results from the use of the truck.

A further object of the invention is to produce a truck of simple construction having a movable floor for the purpose described, so organized as to enable the load to be efficiently supported, and in such a way as to enable a relatively light frame to be employed for supporting the movable floor.

Further objects of the invention will appear hereinafter.

The invention consists in the general combination of parts and in the novel features of the parts hereinafter described, all of which contribute to produce an efficient truck.

A preferred embodiment of my invention will be particularly described in the following specification, while the broad scope of my invention will be pointed out in the appended claims.

In the drawing;

Figure 1 is a plan of a truck embodying my invention, certain parts being broken away;

Fig. 2 is a vertical cross-section taken on the line 2—2 of Fig. 1;

Fig. 3 is a longitudinal vertical section taken on the line 3—3 of Fig. 1;

Fig. 4 is a cross-section taken through the side of the truck and further illustrating details of the preferred construction; and Fig. 5 is a side elevation of the lever which I may employ for effecting the movement of the truck floor and the load carried by it.

Referring more particularly to the parts, the truck comprises a frame 1 having two side bars 2 which may be of channel cross-section (Fig. 2). In applying my invention I provide a plurality of transverse girders, (see Fig. 3) including end girders 4 which are disposed adjacent the ends 5 of the truck, and one or more intermediate girders 6 which are preferably disposed equidistant from each other and equidistant from the end girders 4. These girders are of skeleton or built-up type, and each girder comprises a bottom rail 7 which rests upon, and is fastened to the side bars 2 of the frame. In the end girders 4, these bottom rails 7 simply consist of angle irons, but in the intermediate girders 6 each bottom rail comprises two angle irons $7^a$ and $7^b$ placed back to back, and attached respectively on opposite sides of the girder. Between the angle irons 7ª and 7ᵇ, vertical braces 8 are provided, the upper ends of which are riveted between angle irons 9ª and 9ᵇ which are back to back, and which constitute the upper rail or floor-rail 9. In the end girders 4, the upper rail 9 is composed of a single angle iron.

Near each side of the truck a longitudinal shaft 10 is provided, and these shafts are rotatably mounted in suitable bearings 11 (see Fig. 1). On these shafts are mounted alining sprocket wheels 12, and over the alining sprocket wheels of the opposite shafts, chains 13 run. These chains are entirely independent of the wheels of the truck. They are preferably endless chains, as shown, and are composed of links 13ª, the pivot-connections of the links being provided with rollers 14.

To the links there are attached floor boards 15, and these floor boards extend longitudinally and are intercostal between the girders so as to form a complete floor composed of a plurality of floor sections.

The horizontal flanges of the angle irons 9ª and 9ᵇ support the upper runs of the chains and the floor; and the corresponding flanges of the angle irons 7ª and 7ᵇ support the lower runs of the chains and guide them over the side bars 2.

About on a level with the floor line of the truck and at each side, there is provided a sill 16 which is in the form of an angle iron running longitudinally from end to end of the truck. I provide longitudinally disposed side girders 17 which may be of wood, and these girders are supported at their lower edges on the ends of the rails 7.

Each transverse girder is provided at each end with a gusset plate 18 which is riveted to the lower rail 7 and to the upper rail 9 (see Fig. 4). These plates operate as bearings for the longitudinal side shafts 10, and the outer end of the upper rail 9 carries a long bolt 19 which passes through the adjacent side girder 17, being secured to the girder by nuts 20 seating on its vertical faces.

At suitable points the side girders 17 are provided with sockets 21 which receive side stakes 22 carrying panels 23 which constitute sections or side panels of the sides of the truck. These panels correspond to the spaces between the transverse girders.

The vertical bars 8 of the girders are connected together by suitable longitudinal tie bars 24. A similar tie-bar 24ª connects the foremost intermediate girder to the forward end of the truck. It is unnecessary that the floor boards 15 be provided throughout the entire length of the chains, and it is simply necessary to have enough of these floor boards to extend the width of the truck. The floor boards operate as distance pieces to hold the rollers 14 in proper alinement, and so that they will be supported on the floor rails 9. In that part of the chain which does not carry floor boards I prefer to provide distance rods 25 which extend between the opposite rollers (see Fig. 3) for maintaining the proper distance between the chains.

The sprocket wheels 12 have sockets 26 which receive the rollers, and enable the wheels to pull the chains. It is evident that if one of these shafts 10 is rotated, the floor 27 which is composed of the floor boards 15 will be moved toward the side of the truck, thereby carrying the load laterally so as to move it into reach of the man standing at the side of the truck. The truck is provided with a removable tail-board 29 which carries stakes 30 which are received in suitable stake-sockets 31.

In order to enable the truck floor to be moved at will toward one side or the other of the truck, to facilitate unloading the truck in the manner suggested above, I prefer to let the two side shafts 10 extend beyond the rear end girder of the truck 32 (see Fig. 1), and I provide the ends of the shafts 10, respectively, with sprocket wheels 33 and 34. And I provide a ratchet lever 35 which has a hub at one end, which is attachable to each shaft 10 by sliding it over the exposed end of the shaft. The lever is provided with a double pawl 37. In Fig. 5 one end of the double pawl 37 is illustrated as coöperating with the ratchet wheel 33. Evidently by raising this lever and pulling it down the ratchet wheel 33 can be rotated in a clockwise direction, the effect of which would be to move the floor toward the right-hand side of the truck. Fig. 1 shows the lever 35 mounted in position to coöperate with the ratchet wheel 34. The teeth of the ratchet wheel 34 project toward the right hand side of the truck on the upper side of the ratchet wheel, from which arrangement it follows that the operation of the ratchet lever 35 in coöperation with this ratchet wheel would produce the opposite effect from that resulting from the use of the ratchet wheel 33. That is to say, the truck floor through the medium of the ratchet wheel 34, can be moved toward the left side of the truck. The rear end board 32 of the truck carries a suitable socket 38 to support the end of the lever 35 when the same is not in use.

In using the truck the driver stops the truck so that its side is disposed adjacent to the unloading platform or curb at which the unloading is to occur. He then removes the panels 23 and unloads the bricks or other articles at the edge of the truck, reaching in over the floor of the truck as far as possible. After he has removed all of the bricks he can reach, he then operates the lever 36 so as to bring the remaining bricks over toward the side of the truck. He then proceeds as before to remove all of the bricks he can reach. In this way with one or two advancings of the floor the driver can remove the entire load from the truck very expeditiously.

It is understood that the embodiment of the invention described herein, is only one of the many embodiments my invention may take and I do not wish to be limited in the practice of my invention nor in my claims, to the particular embodiment set forth.

What I claim and desire to secure by Letters Patent is:

1. In a truck, the combination of a frame including two side bars extending substantially parallel with the longitudinal axis of the truck, a plurality of transverse girders resting upon and supported by the upper edges of said side bars, movable chains disposed in coöperating pairs, carried on said girders, floor boards between the girders and connecting the pairs of chains, extending substantially parallel with the side bars, and constituting a substantially horizontal floor for the truck, a removable side board for the truck, and means independent of the wheels of the truck for moving the chains to advance the floor toward the removable side board.

2. In a truck, the combination of a frame, including two side bars substantially parallel with the longitudinal axis of the truck, a plurality of transverse girders resting upon and supported by the upper edges of said side bars, with their ends projecting beyond the side bars, endless chains, disposed in coöperating pairs, floor-boards between the girders connecting the pairs of chains, extending substantially parallel with the side bars and constituting a substantially horizontal floor for the truck, said girders each having a bottom rail for supporting and guiding the lower runs of the endless chains, and an upper rail for supporting the floor and the upper runs of the chains, and means independent of the wheels of the truck and constructed to be operated at will for moving the chains to advance the floor toward the side of the truck.

3. In a truck, the combination of a frame, including two side bars substantially parallel with the longitudinal axis of the truck, a plurality of transverse girders resting upon and supported by the upper edges of said side bars, said girders each comprising a lower rail composed of a pair of angle irons attached respectively at opposite sides of the girder, and an upper rail composed of a pair of angle irons attached at opposite sides of the girder, said angle irons having horizontal flanges, endless chains disposed in coöperating pairs and having upper runs resting on the horizontal flanges of the upper rails, floor-boards between the girders connecting the pairs of chains extending substantially parallel with the side bars and constituting a floor for the truck, supported on the upper rails, and means independent of the wheels of the truck and constructed to be operated at will to move the chains to advance the floor toward the side of the truck.

In testimony whereof, I have hereunto set my hand.

WALTER C. ORTGIER.